(12) United States Patent
Patterson et al.

(10) Patent No.: US 10,508,790 B2
(45) Date of Patent: Dec. 17, 2019

(54) INTRA-CANOPY LED GROW LIGHT

(71) Applicant: Lifted LED, LLC, Rio Rancho, NM (US)

(72) Inventors: Jaxon K. Patterson, Rio Rancho, NM (US); Rob Love, Oro-Medonte (CA)

(73) Assignee: LIFTED LED, LLC, Rio Rancho, NM (US)

( * ) Notice: Subject to any disclaimer, the term of this patent is extended or adjusted under 35 U.S.C. 154(b) by 0 days.

(21) Appl. No.: 15/675,931

(22) Filed: Aug. 14, 2017

(65) Prior Publication Data
US 2019/0049094 A1    Feb. 14, 2019

(51) Int. Cl.
| | |
|---|---|
| *F21V 7/00* | (2006.01) |
| *F21V 7/04* | (2006.01) |
| *A01G 7/04* | (2006.01) |
| *F21Y 115/10* | (2016.01) |
| *F21Y 103/00* | (2016.01) |

(52) U.S. Cl.
CPC ............ *F21V 7/043* (2013.01); *A01G 7/045* (2013.01); *F21V 7/0025* (2013.01); *F21V 7/0066* (2013.01); *F21V 7/005* (2013.01); *F21Y 2103/00* (2013.01); *F21Y 2115/10* (2016.08)

(58) Field of Classification Search
CPC ........ F21V 7/043; F21V 7/005; F21V 7/0066; F21V 7/0025; F21Y 2103/00; A01G 7/04; A01G 7/045
See application file for complete search history.

(56) References Cited

U.S. PATENT DOCUMENTS

| | | | | |
|---|---|---|---|---|
| 5,493,482 | A * | 2/1996 | Bowen | F21L 14/026 |
| | | | | 362/219 |
| 9,395,052 | B1 * | 7/2016 | Shew | F21K 9/27 |
| 2010/0027259 | A1 * | 2/2010 | Simon | F21V 7/043 |
| | | | | 362/245 |
| 2013/0050997 | A1 * | 2/2013 | Bretschneider | F21S 2/005 |
| | | | | 362/190 |
| 2014/0041291 | A1 * | 2/2014 | Salojarvi | A01G 7/045 |
| | | | | 47/29.1 |
| 2014/0140051 | A1 * | 5/2014 | Takatori | F21V 3/049 |
| | | | | 362/224 |
| 2015/0008832 | A1 * | 1/2015 | Chou | H05B 33/0857 |
| | | | | 315/161 |
| 2017/0027109 | A1 * | 2/2017 | Powell | A01G 7/045 |

OTHER PUBLICATIONS

At http://www.dsmt.com/resources/ip-rating-chart/.

* cited by examiner

*Primary Examiner* — Y M. Lee
(74) *Attorney, Agent, or Firm* — Dennis F. Armijo; Rod D. Baker

(57) ABSTRACT

An intra-canopy LED grow light incorporating Optical Lighting Film (OLF), which uses the reflective and transmissive properties of the OLF inside an expandable section of light tubing. The tube and film combination transport a light source distributing the light along the length of the tube. The entire fixture assembly is mounted through the middle of the plant growth by suspending the fixture assembly. The light engine drives the beam down the light tubes, and can be mounted outside of the plant canopy to discourage exposing the plants to additional heat.

15 Claims, 10 Drawing Sheets

INTRA-CANOPY LED GROW LIGHT

BACKGROUND OF THE INVENTION

Field of the Invention (Technical Field)

The presently claimed invention relates to lighting and electronics and more specifically to delivering Light Emitting Diode (LED) grow light wavelengths to the center of the plant canopy in three hundred and sixty degrees (360°), via a tubular lighting fixture.

Background Art

Present-day grow lights are positioned on top of the plants which provide approximately one hundred and eighty degrees (180°) of coverage. Secondly, the lights on the market now disperse the light from a single finite source, such as a light fixture. Due to the configuration of the presently used lights, the grow light wavelength is disbursed either on top of or in front of the canopy. These light fixtures also generate heat which can be detrimental to the plants.

SUMMARY OF THE INVENTION (DISCLOSURE OF THE INVENTION)

The presently claimed invention overcomes the shortcomings of the prior art systems by providing a tubular light emitting structure that is hung or raised by struts inside the canopy, configured to provide the grow light wavelength to plants for more efficient distribution of the light, and distribution of the light in approximately three hundred and sixty degrees (360°), The tubular design of the grow light delivers the grow light wavelength divergently along the entire length of the tube, thus, delivering LED light along the entire length of the row of plants. This mid-plant light wavelength encourages additional and better growth of the plants. Further, by locating the electronics for activating the LEDs outside of the canopy, excess heat generated by the electronics is kept away from the plants. The tubular light emitting structure is preferably waterproof, and the entire light is up to IP67 rated, making it so that moisture has little or no effect on the operation of the presently claimed invention. Pursuant to the International Electrotechnical Commission, the IP stands for ingress Protection (IP), the first number following the letters is the solids protection rating, and the second number represents the liquid protection rating. The configuration of the tubular light emitting structure and location within the canopy also provides a structure for mounting, hanging or climbing trellises for certain plants.

One object of the presently claimed invention is to provide the optimal wavelength of LED light in three hundred and sixty degrees (360°) to the plants by locating the light tube within the plant canopy.

Another object of the presently claimed invention is to provide a light tube of a predetermined length for emitting the LED light along the entire length of the tube.

Another advantage of the presently claimed invention is that the heat producing electronics for driving the LED light tubes is located away from the plants.

Other objects, advantages, novel features, and further scope of applicability of the presently claimed invention will be set forth in part in the detailed description to follow, taken in conjunction with the accompanying drawings, and in part will become apparent to those skilled in the art upon examination of the following, or may be learned by practice of the presently claimed invention. The objects and advantages of the presently claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, serve to explain the principles of the presently claimed invention. The drawings are only for the purpose of illustrating a preferred embodiment of the presently claimed invention and are not to be construed as limiting the presently claimed invention. In the drawings:

DESCRIPTION OF THE PREFERRED EMBODIMENTS (BEST MODES FOR CARRYING OUT THE INVENTION)

The presently claimed invention is a unique grow light for optimizing the growth of plants. Light from a tubular light emitting structure is emitted throughout the tube divergently. Although the term "tube" is depicted as a long circular member, this disclosure is intended to include rectangular, semi-circular, and elliptical members or any combination of the above.

Figure 1:
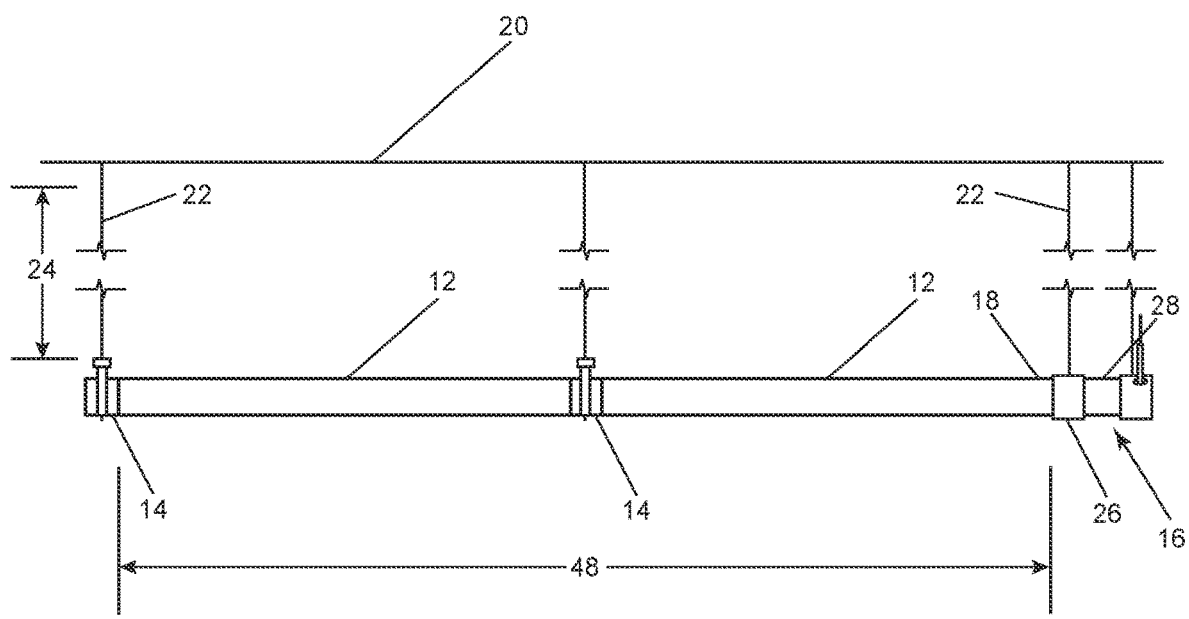
FIG. 1 is a side view of the tubular light emitting structure hung from a ceiling.

FIG. 1 is a side view of a tubular light emitting structure 10. Tubular light emitting structure 10 typically comprises one or more light tubes 12 that can be configured in series by use of couplers 14, as shown. Light tubes 12 are elongated structures for emitting light along the entire length of the tube. Although the figures only show two light tubes 12 held together via coupler 14, this disclosure is intended to include a plurality of light tubes 12 connected in a series. Light engine 16 is mounted at one end 18 of light tube. Light engine 16 can be mounted via coupler 14 or directly affixed to one end 18 of light tube 12. Tubular light emitting structure 10 is suspended from ceiling 20 using adjustable height aircraft cables 22, or the like. Height 24 is optimized depending on the plant type as well as the canopy height. Growers will choose exactly where to mount the luminaire. In an alternative embodiment, light tube can be raised to height 24 by adjustable struts 36, as shown in FIG. 3B.

Figure 2A:
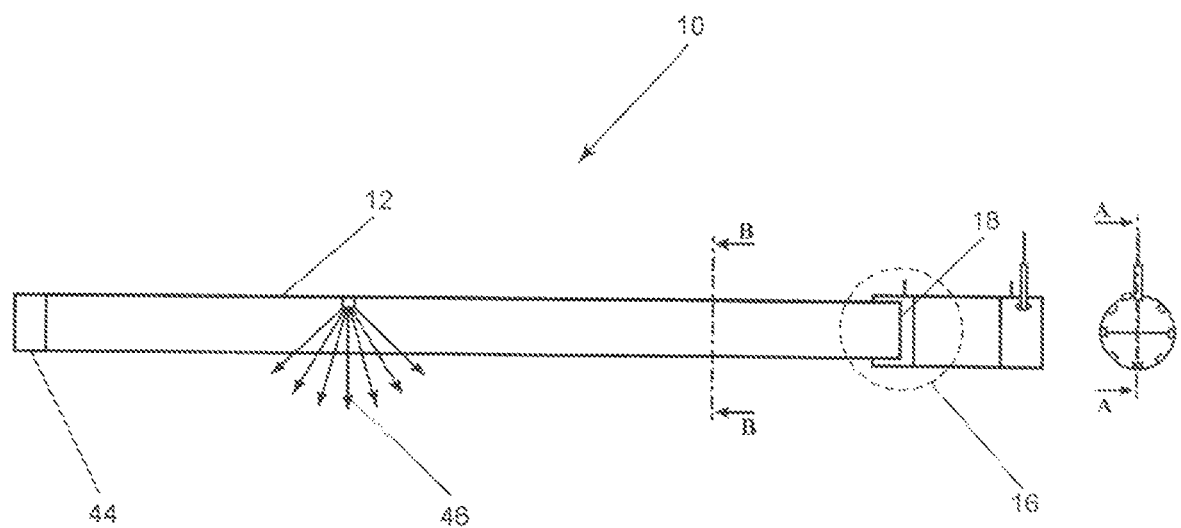
FIG. 2A shows tubular light emitting structure of FIG. 1 with details of the components.
Figure 2B:
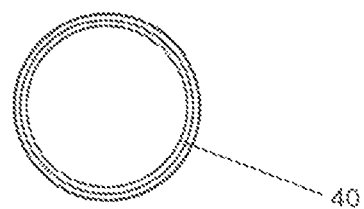
FIG. 2B shows a cut out along line B-B of FIG. 2A.
Figure 2C:
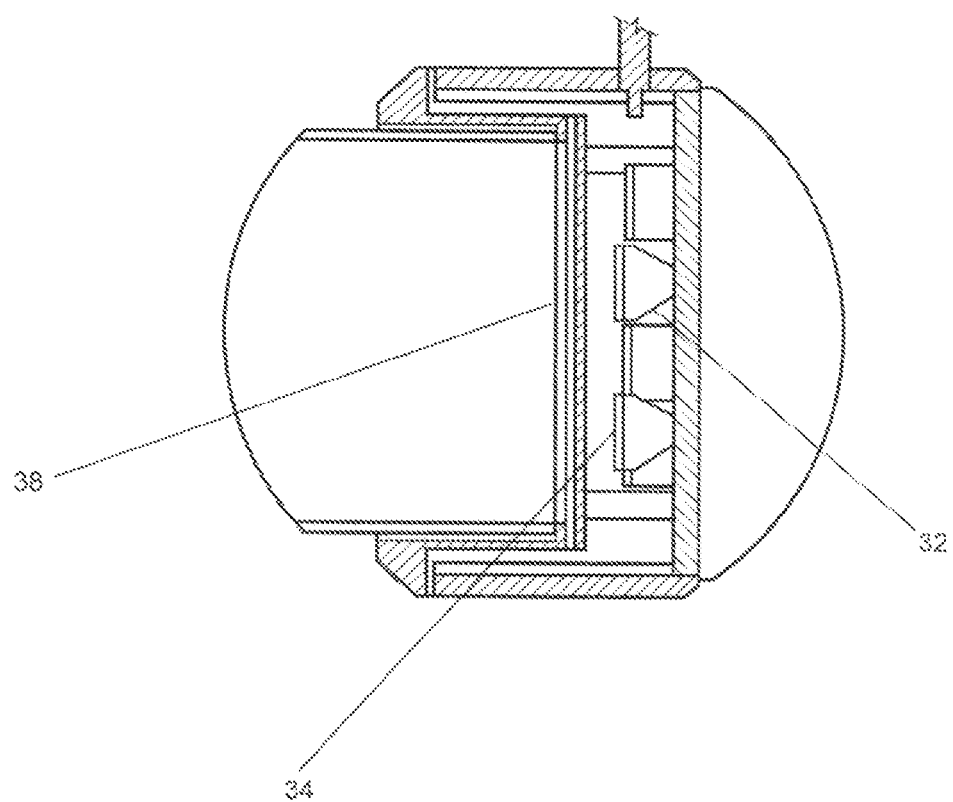
FIG. 2C shows enhanced detail of the preferred light engine in circle C of FIG. 2A.
Figure 2D:
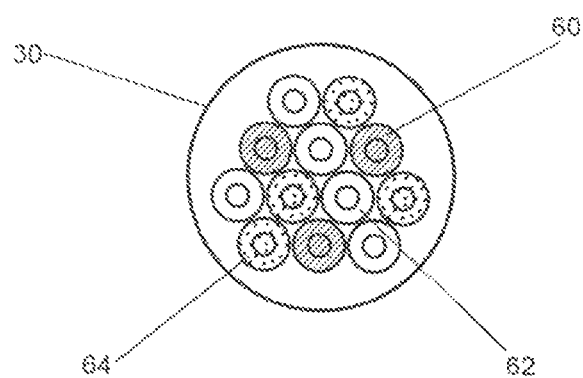
FIG. 2D shows an enhanced view of the preferred Printed Circuit Board Assembly (PCBA).

FIGS. 2A, 2B, and 2C depict the preferred light engine 16. FIG. 2A shows tubular light emitting structure 10 with affixed light engine 16. FIG. 2B shows a cut out along line B-B of FIG. 2A. FIG. 2C shows enhanced detail of light engine 16 in circle C of FIG. 2A. FIG. 2D shows an enhanced view of Printed Circuit Board Assembly (PCBA) 30. As shown in FIG. 1, light engine 16 preferably consists of a power supply and electronics housing 26, a heatsink 28, and as shown in FIG. 2C, a Printed Circuit Board Assembly (PCBA) 30, and housing 32. PCBA 30 is typically supplied with narrow optics 34.

The light passes through the lens 38 into the light distribution tube(s) 12 lined with Optical Lighting Film. (OLF) 40 as shown in FIG. 2B, and reflected at second end of tube 42 using a reflector or mirror 44. The preselected light wave length is emitted from light engine 16 and is reflected off OLF 40 and mirror 44, which divergently disburses light waves 46.

Figure 3A:
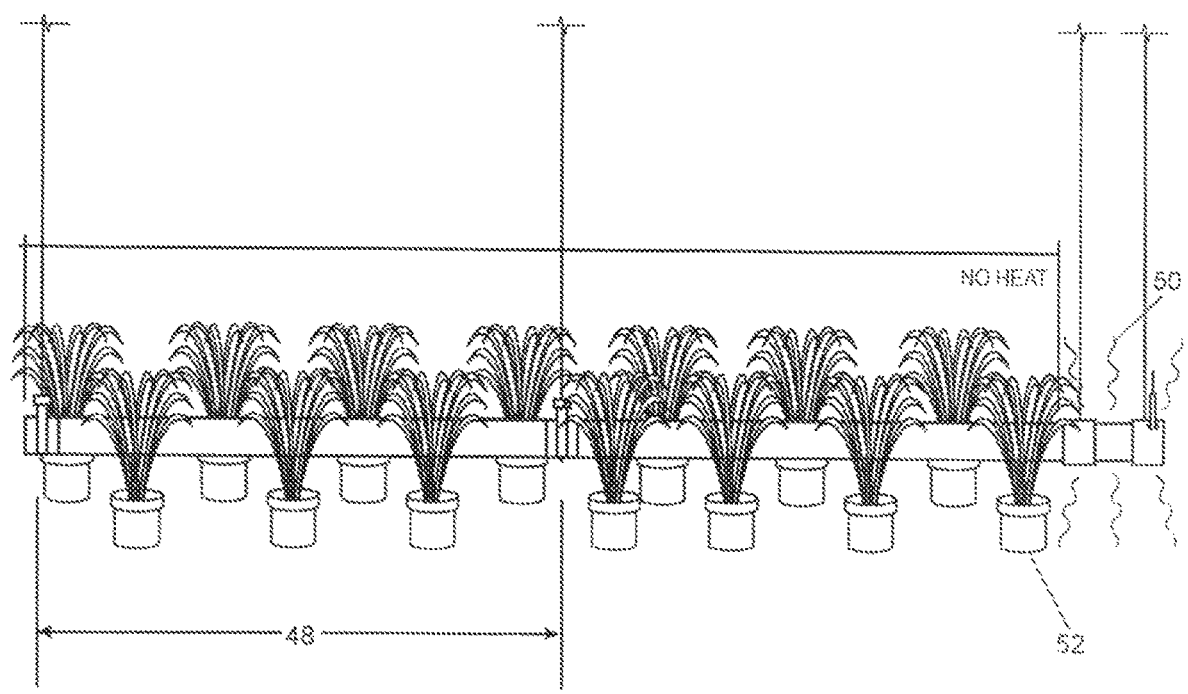
FIG. 3A shows a side view of a typical installation of a suspended tubular light emitting structure.
Figure 3B:
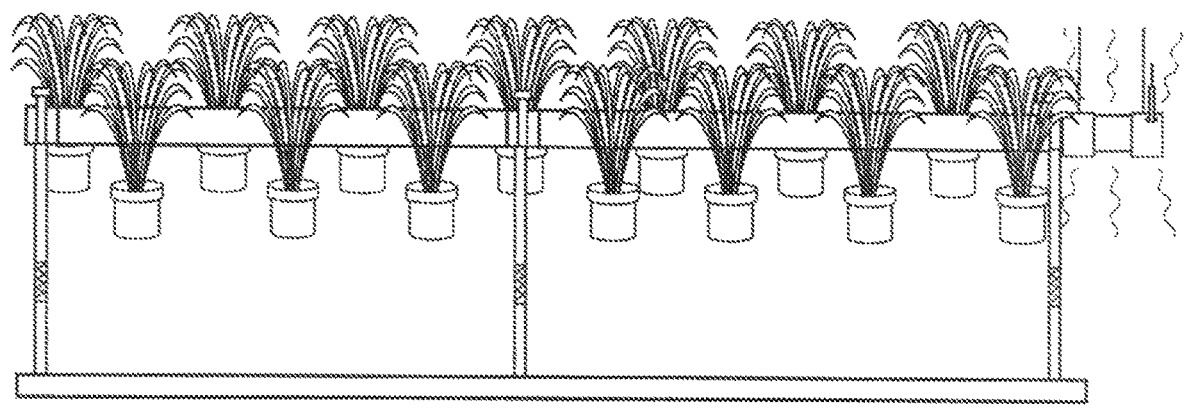
FIG. 3B is an alternative embodiment of a hoisted tubular light emitting structure.
Figure 4:
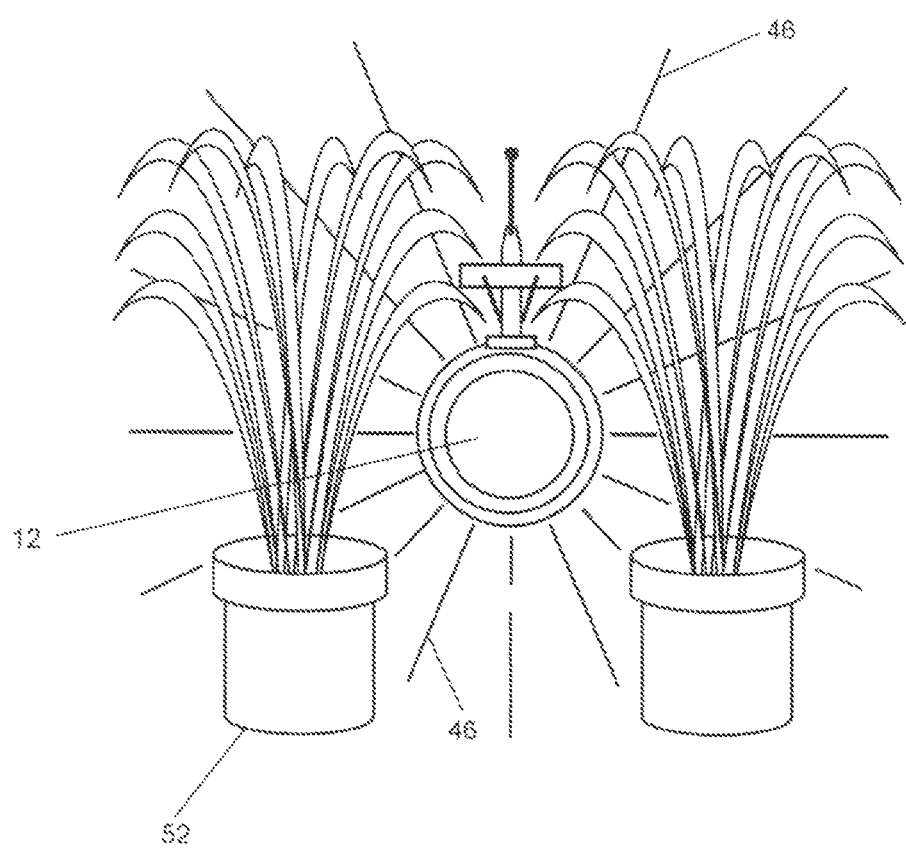
FIG. 4 is a front view of the embodiment of FIGS. 3A and 3B.
Figure 5:
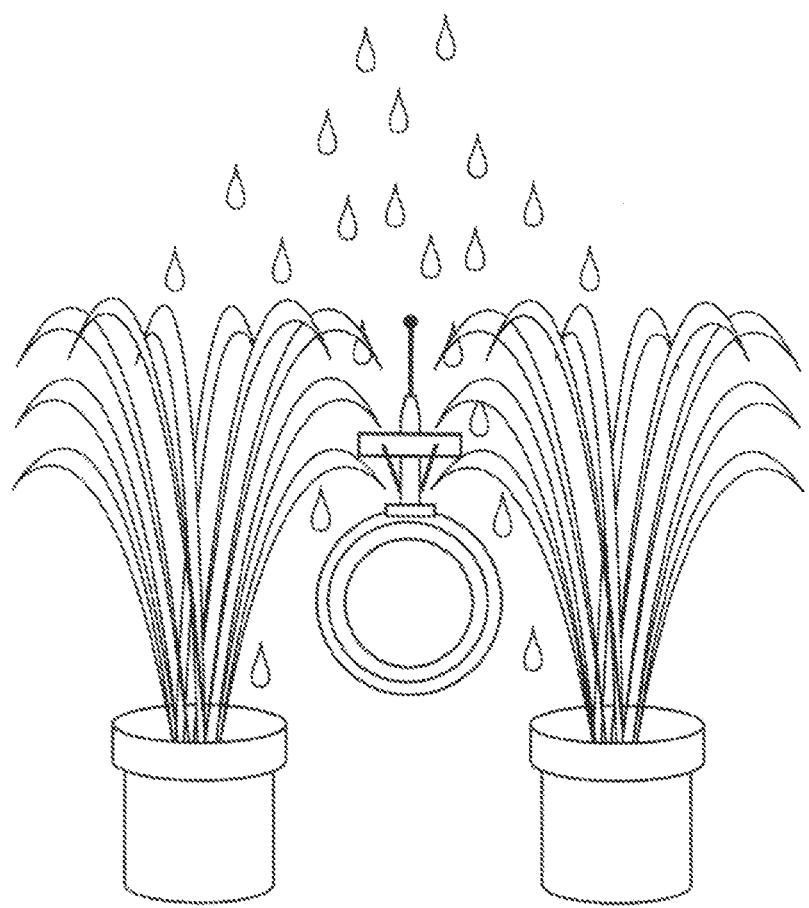
FIG. 5 shows the view of FIG. 4 while the plants are being watered.

Typically tubular light emitting structure 10 is suspended from ceiling 20, or the like, via adjustable structures such as adjustable height aircraft cables 22, as shown in FIGS. 3, 4, and 5. Light tubes 12 are then attached by coupler 14 to light engine 16. Although only a single tubular light emitting structure 10 is shown, this disclosure is intended to include one or more tubular light emitting structures 10 disposed at different heights within the plant canopy. As shown in FIG. 3, the configuration of tubular light emitting structure 10 provided for heat generating components is to be on first end of light tubes so generated heat 50 can be limited to areas not close to plants 52. If desired, light emitting structure can be located outside of the plant canopy. FIG. 4 shows how light waves 46 from tubular light emitting structure 10 are divergently distributed 360° due to the configuration of light tubes 12. In addition, light waves 46 are distributed along the entire length of light tubes 12. Light tubes 12 are typically provided in predetermined lengths 48, when required additional tubes and couplers are attached as shown in FIGS. 3 and 6.

As shown in FIG. 5, light tubes and the fixture housings are IP67 rated and can, thus, withstand high moisture and direct contact with water and other liquid products. Again, since light engine 16 is located away from plants 52, direct contact of water and other liquids is obviated.

Figure 6:
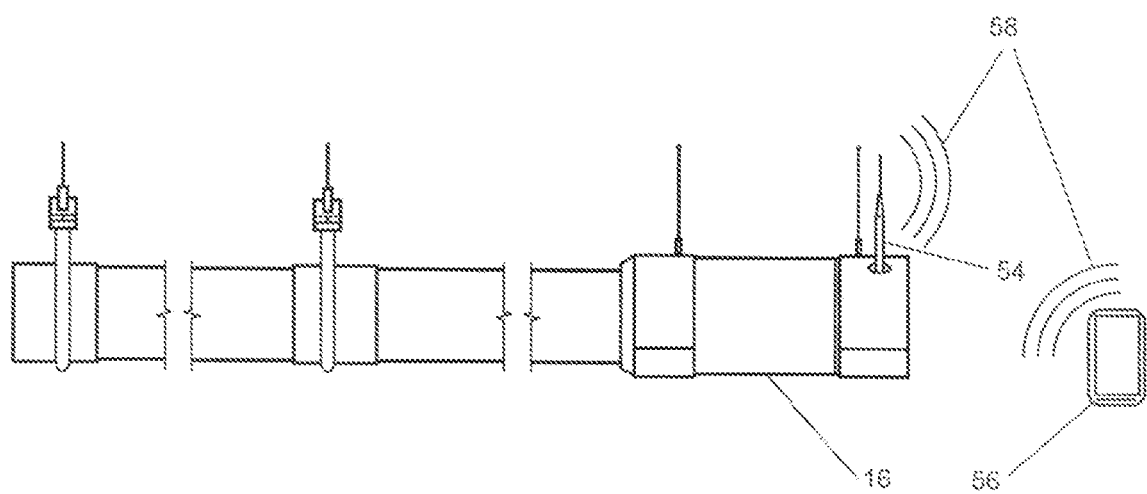
FIG. 6 is a side view of an installation of multiple connected light tubes and the wireless controller for the tubular light emitting structure.

FIG. 6 shows the preferred LED mixture and controller for mixing the light. Each light engine 16 is preferably equipped with a radio module and antenna 54 for communicating with a controller, such as a mobile device or computer 56. Mobile device 56 will communicate 58 to the light fixture so that the color spectrum can be an optimized mixture of LED colors of red 60, blue 62, and white 64, and transmit 58 this information to light engine 16 for implementation. Tubular light emitting structure 10 has WIFI spectrum control to adjust wavelength of light, dependent on stage of growth and type of crop. In addition, such items as on/off and feedback concerning the operation of tubular light emitting structure 10 can be sent via communication system 58 to mobile device 56. In the alternative embodiment, light engine 16 can be hardwired to a controller.

Figure 7:
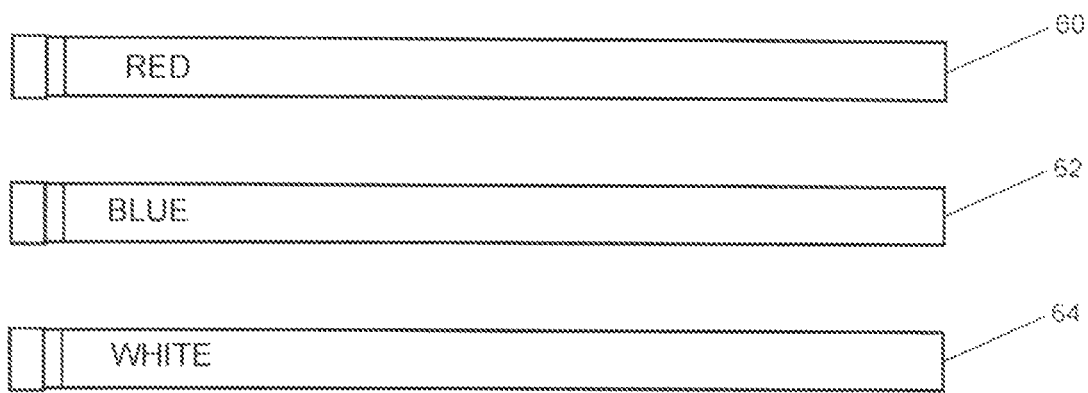
FIG. 7 depicts the mixing of the RED, BLUE, and WHITE LEDs for optimal light generation.

FIG. 7 depicts the preferred LED colors for mixing through tubular light emitting structure 10. In this embodiment red 60, blue 62, and white 64 LEDs are mixed for optimal plant growth. Although these three colors are discussed, this disclosure is intended to include more or less colored LEDs depending on the required mixing wavelength for particular plants, ambient conditions, and other related factors.

Although the presently claimed invention has been described in detail with particular reference to these preferred embodiments, other embodiments can achieve the same results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A grow light comprising:
   an elongated structure configured to be positioned horizontally within a canopy of plants, the elongated structure comprising a single tubular structure;
   a reflective film disposed within the elongated structure;
   a single light engine disposed on a first end of the elongated structure configured to emit a preselected wavelength of light and further comprising a Printed Circuit Board Assembly (PCBA) comprising narrow optics, wherein the single light engine comprises an electronic housing, the housing positioned at one end of the single tubular structure and located outside of the plant canopy, and electronics for activating light emitting diodes (LEDs) and power supply within the housing and located outside of the plant canopy; and
   a reflector on a second end of the elongated structure.

2. The grow light of claim 1 wherein the elongated structure is configured to deliver up to three hundred and sixty degrees (360°) of illumination of the emitted preselected wavelength of light along an entire length of the elongated structure.

3. The grow light of claim 1 further comprising a remote controller for selecting the wavelength of light in the light engine.

4. The grow light of claim 1 wherein the elongated structure comprises a moisture proof enclosure.

5. The grow light of claim 1 wherein the light engine comprises a plurality of preselected light emitting diodes (LEDs).

6. The grow light of claim 1 wherein the elongated structure comprises more than one light tube connected in series via couplers.

7. The grow light of claim 1 further comprising adjustable structures for suspending the grow light from a ceiling or raising the grow light from a ground level.

8. A method for illuminating a plant canopy with light, the method comprising the steps of:
   providing a grow light comprising an elongated structure configured to be positioned horizontally in the plant canopy, the elongated structure comprising a single tubular structure, a reflective film disposed within the elongated structure, a single light engine disposed on a first end of the elongated structure comprising a Printed Circuit Board Assembly (PCB) with narrow optics, wherein the single light engine comprises an electronic housing, the housing positioned at one end of the single tubular structure and located outside of the plant canopy, and electronics for activating light emitting diodes (LEDs) and power supply within the housing and located outside of the plant canopy, and a reflector on a second end of the elongated structure; horizontally locating the grow light within the plant canopy;
   selecting a predetermined wavelength for the illuminated light;
   illuminating the plant canopy with the predetermined wavelength of light; and preventing heat emitted by the light engine from the plant canopy.

9. The method of claim 8 wherein the step of illuminating comprises illuminating up to three hundred and sixty degrees (360°) of illumination of the emitted preselected wavelength of light along an entire length of the elongated structure.

10. The method of claim 8 wherein the step of locating comprises hanging the grow light from a ceiling or raising the grow light from a ground level.

11. The method of claim 8 wherein the step of selecting comprises using a remote controller.

12. The method of claim 11 wherein the remote controller comprises a Wi-Fi enabled controller.

13. The method of claim 8 wherein the elongated structure comprises more than one light tube connected in series via couplers.

14. The method of claim 8 further comprises the step of preventing moisture from entering an interior of the elongated structure.

15. A grow light comprising an elongated structure configured to be positioned horizontally within a canopy of plants, the elongated structure comprising:
 a tubular structure;
 a reflective film disposed within the tubular structure;
 a light engine disposed at a first end of the elongated structure entirely outside the plant canopy and configured to emit a preselected wavelength of light, the light engine comprising:
  an electronic housing positioned at one end of the tubular structure;
  electronics for activating light emitting diodes (LEDs); and
  a power supply within the housing; and
 a reflector at a second end of the elongated structure.

* * * * *